US012598210B2

(12) United States Patent
Zhang

(10) Patent No.: US 12,598,210 B2
(45) Date of Patent: Apr. 7, 2026

(54) APPARATUS AND METHOD TO MITIGATE MALICIOUS CALLS IN A WIRELESS NETWORK

(71) Applicant: Telefonaktiebolaget LM Ericsson (publ), Stockholm (SE)

(72) Inventor: Qiwen Zhang, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 18/030,173

(22) PCT Filed: May 20, 2021

(86) PCT No.: PCT/IB2021/054387
§ 371 (c)(1),
(2) Date: Apr. 4, 2023

(87) PCT Pub. No.: WO2022/079501
PCT Pub. Date: Apr. 21, 2022

(65) Prior Publication Data
US 2023/0370493 A1      Nov. 16, 2023

Related U.S. Application Data

(60) Provisional application No. 63/092,799, filed on Oct. 16, 2020.

(51) Int. Cl.
*H04L 29/06* (2006.01)
*H04L 9/40* (2022.01)
(Continued)

(52) U.S. Cl.
CPC ....... *H04L 63/1458* (2013.01); *H04W 12/121* (2021.01); *H04W 80/10* (2013.01)

(58) Field of Classification Search
CPC ......................... H04L 63/1458; H04W 12/121
See application file for complete search history.

(56) References Cited

U.S. PATENT DOCUMENTS

2005/0108567 A1      5/2005  D'Souza et al.
2007/0121596 A1*     5/2007  Kurapati ............... H04M 3/436
                                                                  370/356
(Continued)

FOREIGN PATENT DOCUMENTS

EP              1533977 A1      5/2005

OTHER PUBLICATIONS

Lu et al., "Ghost Calls from Operational 4G Call Systems: IMS Vulnerability, Call DoS Attack, and Countermeasure", Proceedings of the 26th Annual International Conference on Mobile Computing and Networking, ACMPUB27, Apr. 16, 2020, 14 pages.
(Continued)

*Primary Examiner* — Jeffrey C Pwu
*Assistant Examiner* — Thong P Truong
(74) *Attorney, Agent, or Firm* — NICHOLSON DE VOS WEBSTER & ELLIOTT LLP

(57)                     ABSTRACT

Embodiments of invention mitigate stealthy DoS attack and the multiple concurrent ghost calls through enhancing the SIP call procedures. In one embodiment, a first SIP invite message is forwarded from a caller party to a callee party to set up a SIP session, and in response to the first SIP invite message, a timer is started and forwarding one or more session progress messages are forwarded to the caller party. If the caller party is unresponsive upon expiration of the timer, a counter is incremented once and an additional SIP invite message from the caller party is forwarded to the callee party, which responds with session progress messages. When the caller party remains unresponsive and the
(Continued)

counter reaches a threshold, the subsequent SIP messages from the caller party are dropped.

20 Claims, 4 Drawing Sheets

(51) Int. Cl.
  *H04W 12/121* (2021.01)
  *H04W 80/10* (2009.01)

(56) References Cited

U.S. PATENT DOCUMENTS

| | | | |
|---|---|---|---|
| 2010/0128862 A1 | 5/2010 | Vendrow | |
| 2014/0289840 A1 | 9/2014 | Jain et al. | |
| 2019/0356635 A1 | 11/2019 | Chiang et al. | |

OTHER PUBLICATIONS

Rosenberg et al., "Reliability of Provisional Responses in the Session Initiation Protocol (SIP)", Network Working Group, Request for Comments: 3262, Jun. 2022, pp. 1-14.
Rosenberg et al., "SIP: Session Initiation Protocol", Network Working Group, Request for Comments: 3261, Jun. 2002, pp. 1-269.

* cited by examiner

APPARATUS AND METHOD TO MITIGATE MALICIOUS CALLS IN A WIRELESS NETWORK

CROSS-REFERENCE TO RELATED APPLICATIONS

This application is a National stage of International Application No. PCT/IB2021/054387, filed May 20, 2021, which claims the benefit of U.S. Provisional Application 63/092, 799, filed on Oct. 16, 2020, entitled "APPARATUS AND METHOD TO MITIGATE GHOST CALLS AND STEALTHY DOS VULNERABILITY IN IMS VOLTE AND VOWIFI," which are incorporated by reference herein in its entirety.

TECHNICAL FIELD

Embodiments of the invention relate to the field of networking, particularly mitigating malicious calls in a wireless network.

BACKGROUND ART

The Internet Protocol (IP) multimedia subsystem (IMS), also referred to as IP multimedia core network subsystem, is an architectural framework for delivering IP multimedia services. The IMS has been designed by the wireless standards body 3rd Generation Partnership Project (3GPP) to aid the access of multimedia and voice applications from wireless and wireline terminals. Similar technologies to access and provision services across wired and wireless networks include generic access network (GAN) and software switch (softswitch). These technologies are aimed at removing the differences between fixed and mobile networks and may be referred to as fixed-mobile convergence (FMC) technologies.

The FMC technologies may be used in wireless networks to implement services such as voice over long-term evolution (VoLTE) service, voice over wireless fidelity (VoWi-Fi) service, or voice over the fifth generation (Vo5G) service. Yet critical vulnerabilities have been identified in these implementations, and that can be exploited by an adversary (attacker).

For example, the adversary may make ghost calls to launch a stealthy denial of service (DoS) attack against specific cellular users (victims). A ghost call includes a call (e.g., a session initiation protocol (SIP) call) that, when a recipient of the call (callee) answers, there is no one on the other end of the call. Ghost calls can block the callee from receiving normal calls thus becoming a victim of the stealthy DoS attack. In user equipment (UEs) of a VoWi-Fi, VoLTE, or Vo5G network (referred to as VoWi-Fi, VoLTE, or Vo5G UEs), the SIP signaling is specified to be terminated in the IMS mobile application, but security of the communication is handled by the operating system (OS). The adversary may manipulate the SIP signaling in the SIP session establishment procedure if the adversary (caller) has the root access to the UE's OS, and cause the called UE (callee) to stay in a waiting state. The called UE cannot make or receive any calls within a waiting period (e.g., 15 to 30 seconds), and the adversary may repeat the manipulation to achieve a stealthy DoS attack.

Additionally, a core network (e.g., an IMS core) currently does not prohibit concurrent call attempts, which allows a single adversary to establish multiple concurrent ghost calls to the multiple callees, causing nuisance to the called users.

To prevent the stealthy DoS attacks (to a single callee or multiple callees), it is desirable to enhance the SIP call procedure in a wireless network.

SUMMARY OF THE INVENTION

Embodiments include methods to coordinate session initiation protocol (SIP) calls in a network. In one embodiment, a method comprises forwarding a first SIP invite message from a caller party to a first callee party to set up a SIP session and starting a timer and forwarding one or more session progress messages to the caller party from the first callee party in response to the first SIP invite message. When the caller party is unresponsive to the one or more session progress messages upon expiration of the timer, the method includes incrementing a counter once and forwarding an additional SIP invite message from the caller party to the first callee party to set up the SIP session and restarting the timer and forwarding additional one or more session progress messages from the first callee party to the caller party in response to the additional SIP invite message. The method further includes, when the caller party remains unresponsive to the additional one or more session progress messages upon expiration of the timer, repeating the increment of the counter, the SIP invite message forwarding, the timer restarting, and the session progress messages forwarding, until the counter reaches a threshold, and the method additionally includes dropping subsequent SIP messages from the caller party upon the counter reaching the threshold.

Embodiments includes electronic devices to coordinate session initiation protocol (SIP) calls in a network. In one embodiment, an electronic device comprises a processor and machine-readable storage medium that provides instructions that, when executed by the processor, cause the electronic device to perform: forwarding a first SIP invite message from a caller party to a first callee party to set up a SIP session and starting a timer and forwarding one or more session progress messages to the caller party from the first callee party in response to the first SIP invite message. When the caller party is unresponsive to the one or more session progress messages upon expiration of the timer, the electronic device further performs: incrementing a counter once and forwarding an additional SIP invite message from the caller party to the first callee party to set up the SIP session and restarting the timer and forwarding additional one or more session progress messages from the first callee party to the caller party in response to the additional SIP invite message. When the caller party remains unresponsive to the additional one or more session progress messages upon expiration of the timer, the electronic device additionally performs: repeating the increment of the counter, the SIP invite message forwarding, the timer restarting, and the session progress messages forwarding, until the counter reaches a threshold, and the electronic device also performs: dropping subsequent SIP messages from the caller party upon the counter reaching the threshold.

Through embodiments of the invention, stealthy DoS attacks (to a single callee or multiple callees) may be mitigated through enhancing the SIP call procedures as disclosed herein.

BRIEF DESCRIPTION OF THE DRAWINGS

The invention may best be understood by referring to the following description and accompanying drawings that are used to illustrate embodiments of the invention.

DETAILED DESCRIPTION

Figure 1:
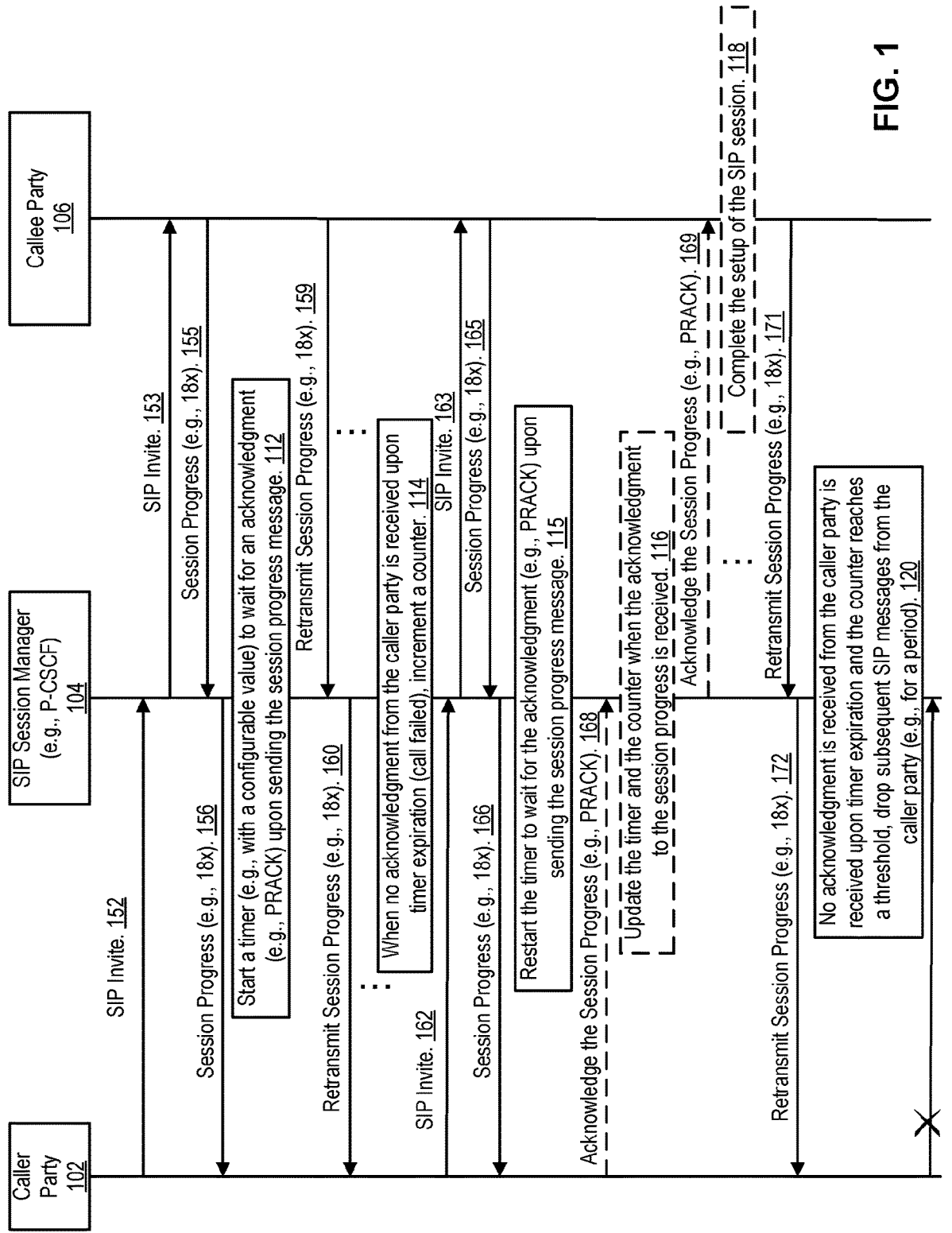
FIG. 1 shows operations to mitigate a stealthy DoS attack against a single callee per some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Stealthy Denial of Service (DoS) Attacks

Standardization efforts, such as Global System for Mobile Communications (GSMA), 3GPP, and Internet Engineering Task Force (IETF), are often based on a trust model where balance between risks and mitigations have been evaluated. Consumer devices, such as UEs (which may implement VoWi-Fi, VoLTE, or Vo5G), are trusted by the network to some degree to behave correctly, especially when a UE has already been authenticated as a legitimate device.

For the Session Initiation Protocol (SIP) protocol, the IETF RFC 3262 specifies an extension to the SIP to provide reliable provisional response messages. This extension uses an option tag 100rel (which designates SIP provisional message reliability) and defines the Provisional Response ACKnowledgement (PRACK) method. The 3GPP standard on VoLTE or VoWi-Fi requires the precondition mechanism in order to ensure the Quality of Service (QoS) of a SIP call. Precondition uses the mechanism defined in RFC 3262. Note that as used in this Specification, unless specified otherwise, the party that initiates a SIP session may be referred to as the caller party, caller terminal device or UE, or simply caller, while the party with which the SIP session is to be established may be referred to as the callee party, callee terminal device or UE, or simply callee.

With the extension to the SIP protocol, when making a call in a wireless network, the caller sets an option tag precondition in the INVITE SDP (Session Description Protocol) request's Supported header, together with another option tag 100rel, which indicates the reliability. The callee replies to the INVITE with a 18× provisional response, Session Progress. Note that the 18× provisional response is defined to be a set that includes 180 (Ringing), 181 (Call is Being Forwarded), 182 (Queued), and 183 (Session Progress).

In the Session Progress response, the callee confirms a set of service requirements (e.g., port and session parameters) that are specified in the INVITE SDP request, as well as the sets of the precondition option tags. Meanwhile, the callee starts to do resource reservation based on the requirements and waits for a reliable alerting indication (e.g., a PRACK message) from the caller to alert the user. After receiving the Session Progress response, the caller also reserves resource at its side and acknowledges the Session Progress response with the reliable alerting indication (e.g., the PRACK message). After receiving the reliable alerting indication, the callee starts to ring to alert the callee user to answer the call and establish the SIP call session. Note that while the PRACK message is used as an example of the reliable alerting indication, another message from the caller may be used to acknowledge the Session Progress response (or another response to an invitation to establish a SIP session).

However, the reliability mechanism of the provisional response can be abused. The caller UE, by not responding to the callee UE with the PRACK message, may cause the callee UE to be stuck in the proceeding state of the SIP call session to wait on the PRACK message from the caller. In this state, the callee UE cannot accept other incoming calls, as the callee UE cannot leave the pending SIP call session until the PRACK message (which acknowledges the 18× Session Progress) is received or the call is canceled. For reliability, the callee UE retransmits the 18× Session Progress. When the retransmission times reach a maximum number, the IMS node cancels the call by sending a CANCEL message to the callee UE. By making the malicious ghost call, the caller UE thus abuses the reliability mechanism of the provisional response to prevent the callee UE from receiving incoming calls without awareness of the callee user.

After the CANCEL message is sent, the caller UE may send the INVITE to the callee UE again without ever answering the PRACK message, thereby keeping the callee UE in the proceeding state. Since the callee UE does not ring without receiving the PRACK message, the callee UE is stuck in the waiting state. Although being stuck can sustain for only a short time period (e.g., 15 to 30 seconds), the mechanism of making ghost SIP calls can be exploited as a building block to launch a long-time call DoS attack on the callee UE without the callee user being aware of the attack, and such an attack may be referred to as a stealthy DoS attack.

Another way of initiating a stealthy DoS attack is to call multiple callee UEs at the same time from a caller UE. The core network does not prohibit concurrent call attempts from a single caller UE to multiple callee UEs, and when the single caller initiates multiple SIP sessions, each to a callee UE, the multiple callee UEs may be stuck in the SIP session setup process with the single caller UE and can't receive another call or make calls to other parties, resulting in a DoS attack.

Note that the DoS attacks in a wireless network may be initiated where the attacking caller and the victim callee (e.g., a VoLTE or VoWi-Fi UE) are in the same network. The attacker may use a "rooted" UE for the attack. A rooted UE allows the user to attain privileged control (known as root access) over the UE operating system, gives the ability (or permission) to alter or replace UE system applications and settings, run specialized applications that require administrator-level permissions or perform other operations that are otherwise inaccessible to a normal user. The attack may target a single callee (victim) UE at a time; and while the callee UE recovers automatically after the attacker stops exploring the reliability mechanism of the provisional response, the callee UE is at the mercy of the attacker without knowing that it is under the stealthy DoS attack (since a normal caller UE may fail to respond to a callee UE's message at times).

Mitigate Stealthy DoS Attack: Single Caller to Single Callee

A first set of embodiments may enhance the SIP protocol and mitigate the stealthy DoS attack against a callee described above. FIG. 1 shows operations to mitigate a stealthy DoS attack against a single callee per some embodiments. Three entries are shown for establishing a SIP call session, a caller party 102, a SIP session manager 104, and a callee party 106. The SIP session manager 104 may be implemented in a first network node of an IMS network (e.g., an IMS node) that the caller party 102 connects. The first network node may be a gateway or a session border controller (SBC) of the IMS network, or another network node that coordinates SIP call sessions within the IMS network. The SIP session manager 104 may be implemented within a proxy call session control function (P-CSCF) of the first network node. The caller party 102 can be either registered with the P-CSCF or not registered. Note that a caller party may make calls such as 911 emergency calls without registration.

At reference 152, the caller party 102 transmits a SIP invite message (e.g., a SIP INVITE SDP request) to the SIP session manager 104, which forwards on the SIP invite message to eventually reach the callee party 106 at reference 153. The SIP invite message includes Supported header with an option tag precondition in the SIP invite message's header, together with another option tag 100rel, which indicates the reliability.

At reference 155, the callee party 106 replies to the SIP invite message with a session progress message, which is within a 18× provisional response in one embodiment. The session progress message includes Require header with an option tag 100rel. The SIP session manager 104 receives the session progress message and forwards it on and eventually reaches the caller party 102 at reference 156. While forwarding the session progress message, the SIP session manager 104 starts a timer to measure the time period that it waits until it receives a corresponding acknowledgement (e.g., the PRACK message from the caller party 102) to the session progress message at reference 112. The timer is started at or right before/after the SIP session manager 104 forwards the session progress message. The timer duration may be a configurable value (e.g., a value between 15 to 30 seconds), and the configurable value may be predetermined or dynamically set once the SIP call session starts. The default timer duration may be set to 64*T1 (e.g., T1 may be set to be 500 milliseconds per SIP standards).

Note that the callee party 106 waits for the acknowledgement from the caller party 102 after transmitting the session progress message so it may ring to alert the callee user to answer the call and establish the SIP call session. During the waiting, the callee party 106 cannot receive other calls or make calls to other parties.

The caller party 102 does not respond to session progress message from the callee party 106 with the PRACK message. After waiting for a duration (e.g., initially 1 T1, then double to 2 T1 when no acknowledgement is received, further double again to 4 T1 when no acknowledgement is received and so on, as described in RFC 3262) without receiving the PRACK message from the caller party 102, the callee party 106 retransmits the session progress message at reference 159, and the retransmitted session progress message is forwarded by the SIP session manager 104 to the caller party 102 again at reference 160.

If the caller party 102 ignores the session progress message again after the corresponding duration, the callee party 106 will continue retransmitting the session progress message for the SIP session manager 104 to forward to the caller party 102, until the timer expires, or a SIP error response is received. The SIP error response may be generated by another SIP node between SIP session manager 104 and the callee party 106 due to timer C (specified by RFC 3261) configured at that SIP node expires. When the timer expires or the SIP error response is received, the SIP session manager 104 increments a counter once (e.g., increase to value one from initial value zero) or alternatively decrease a counter once (e.g., decrease from initial value five to four), indicating that a ghost call may have happened in the SIP session between the caller party 102 and callee party 106. The counter may have a configurable counter threshold (e.g., an integer between one to five), and the configurable threshold value may be predetermined or dynamically set once the SIP call session starts.

Note that while the caller party 102 remains unresponsive to the session progress message, the call session is failed as it is stuck in the call setup stage, during which the callee party 106 cannot receive any other calls or make calls to other parties. The caller party 102 may be notified of the failure by the SIP session manager 104, which may send a SIP error response to the caller party 102 upon the determination that the SIP session has failed.

The caller party 102 may initiate another SIP session at reference 162 (e.g., in response to receiving the SIP error response) to the same callee party 106 by transmitting a SIP invite message to the SIP session manager 104, which forwards on the SIP invite message, which eventually reaches the callee party 106 at reference 163. Again, the callee party 106 responds with a session progress message at reference 165, and the SIP session manager 104 restarts the timer at reference 115 and forwards the session progress message to the caller party 102 at reference 166.

If the caller party 102 is not an adversary making malicious calls, the caller party 102 may respond to the session progress message with an acknowledgement (e.g., a PRACK message) at reference 168. In that case, the timer and counter may be updated once the SIP session manager 104 receives the acknowledgement from the caller party 102. For example, the timer and counter may be reset to their respective default values (e.g., both being reset to value zero). The acknowledgement is forwarded on and eventually reaches the callee party 106 at reference 169, and the callee party may proceed to complete the setup of the SIP session at reference 118 (e.g., to ring the callee user to answer the call).

However, if the caller party 102 is an adversary that intends to initiate a DoS attack, the caller party will remain silent and not respond to the session progress messages forwarded by the SIP session manager 104. The callee party 106 will continue retransmitting the session progress messages for the SIP session manager 104 to forward to the caller party 102 at references 171 and 172, until the timer expires, or a SIP error response is received, when the counter is incremented/reduced by one again. The updated counter value is compared to the counter threshold. When the SIP session manager 104 determines that no acknowledgement has been received from the caller party 102 for the session progress message from the callee party 106, the timer is expired or a SIP error response message is received, and the updated counter value reaches the counter threshold, the SIP session manager 104 drops subsequent SIP messages from the caller party 102 at reference 120.

By dropped the subsequent SIP messages from the caller party 102, the SIP session manager 104 prevents the potential DoS attack against the callee party 106. The SIP session manager 104 may block the caller party 102 for a configurable duration (e.g., 5 minutes), during which the callee party may receive and make calls and the stealthy DoS attack is mitigated.

Note the caller party 102 may be allowed to initiate SIP calls again after the configurable duration, and the SIP session manager may log the activities by the caller party 102 and the blocking event, and the SIP session manager may trigger an alarm when the potential DoS attack is detected and blocked. If the caller party 102 is registered with the IMS network, once the caller party is deregistered, its corresponding counter for the call attempt to the callee party 106 should be removed. If the caller party 102 is not registered, the corresponding counter may be flushed periodically (e.g., once per day).

Note that the SIP session manager may identify whether a SIP message is from the caller party 102 based on the source IP address included in the SIP message when the caller party 102 is coupled to the SIP session manager 104 without going through a network address translation (NAT) module, or when the caller party is coupled to the SIP session manager 104 through the NAT module, the caller party 102 may be identified through the source IP address and port number. Additionally/alternatively, the SIP session manager 104 may identify whether a SIP message is from the caller party 102 based on the IP multimedia public identity (IMPU) in the SIP invite message if the caller party 102 is behind a SIP proxy/back-to-back user agent (B2BUA) (such as SIP private branch exchange (PBX)).

Mitigate Stealthy DoS Attack: Single Caller to Multiple Callees

Figure 2:
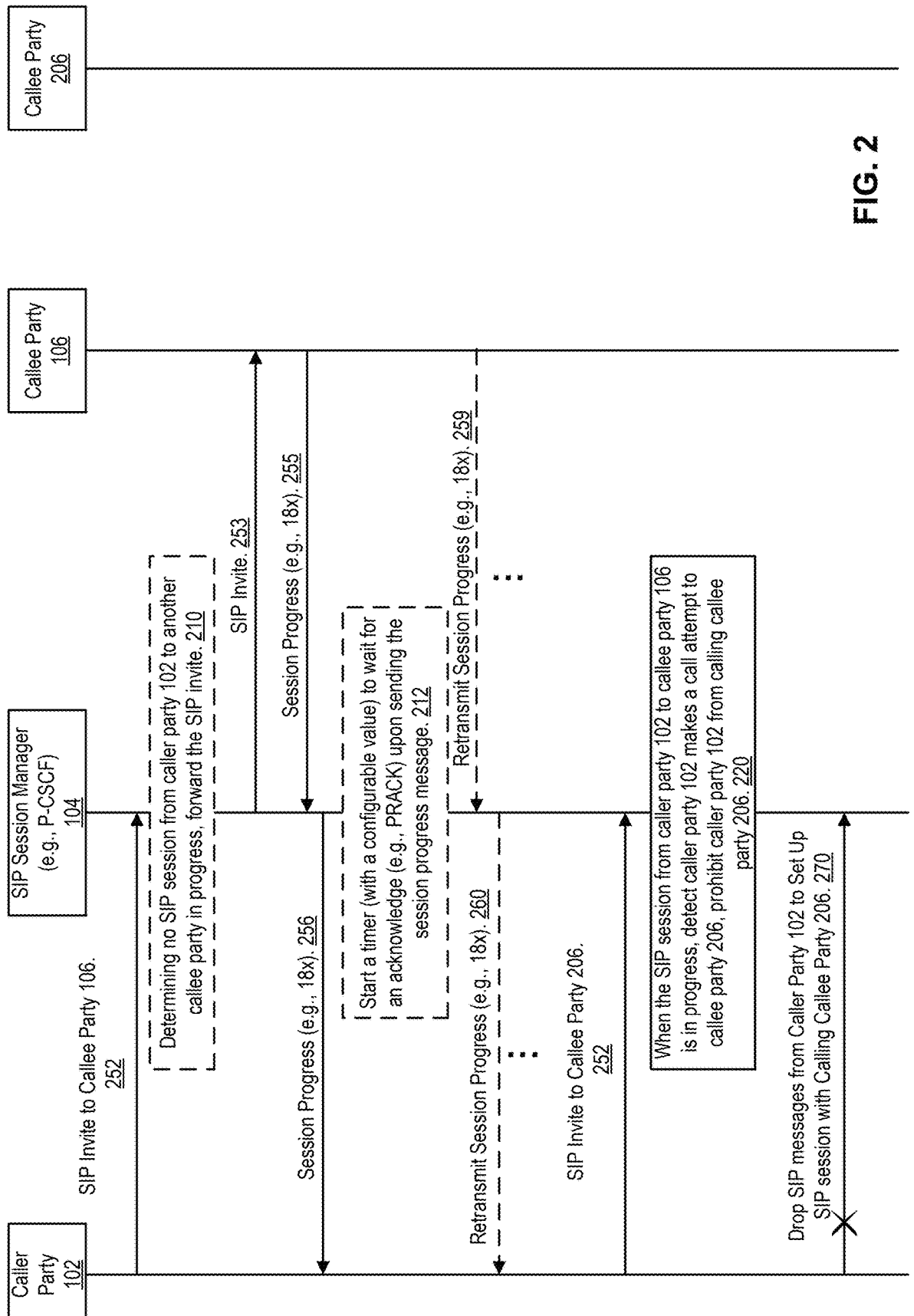
FIG. 2 shows operations to mitigate a stealthy DoS attack involving multiple callees per some embodiments.

A second set of embodiments may enhance the SIP protocol and mitigate the stealthy DoS attack where a single caller initiates concurrent SIP sessions with multiple callees described above. FIG. 2 shows operations to mitigate a stealthy DoS attack involving multiple callees per some embodiments. In addition to the caller party 102, SIP session manager 104, and callee party 106, FIG. 2 also includes another callee party 206.

At reference 252, the caller party 102 transmits a SIP invite message (e.g., a SIP INVITE SDP request) to the SIP session manager 104. At reference 210, the SIP session manager 104 determines that there is no SIP session from the caller party 102 to another callee party that is in progress. Upon the determination, the SIP session manager 104 forwards on the SIP invite message, which eventually reaches the callee party 106 at reference 253.

The transmission and forwarding of the session progress message at references 255 and 256 are similar to the operations at references 155 and 156, and so do the operation at reference 212 to 112, and retransmission of the session progress at references 259 and 260 to the one at references 159 and 160, respectively. While the SIP session setup between the caller party 102 and the callee party 106 is in progress, the caller party 102 transmits a SIP invite message to the SIP session manager 104 to set up a SIP session with callee party 206. Upon detecting the caller party 102 making the call attempt to the callee party 206, the SIP session manager 104 prohibits caller party 102 from calling the callee party 206 at reference 220. The subsequent SIP messages from the caller party 102 to set up a SIP session with the callee party 206 are dropped at reference 270. The SIP session manager 104 may issue a 403 forbidden message to the caller party 102 to prevent the caller party from launching DoS attacks against multiple callees.

The second set of embodiments takes into consideration that a normal caller party cannot make concurrent call attempts, e.g., making a mobile originating (MO) call (regardless of being a normal call, 911 call, or priority call) before a pending call session is established. Since the normal caller party doesn't provide the option to make another MO call during the period that the pending call session is to be established, the SIP session manager 104 may implement the mechanism to prohibit the concurrent call attempts from the caller party, when the originating call to another callee party is still in progress. The SIP session manager 104 may reject the later call attempt using a 403 Forbidden message.

Operations of Some Embodiments

The sets of embodiments discussed herein enhance SIP session management to prevent stealthy calls from causing DoS attacks, and a SIP session manager may act as a SIP layer firewall to protect the IMS core from such DoS attacks. The sets of embodiments can be implemented to enhance the existing SIP protocols per standards and provide further reliability in establishing SIP sessions within a wireless network.

Figure 3:
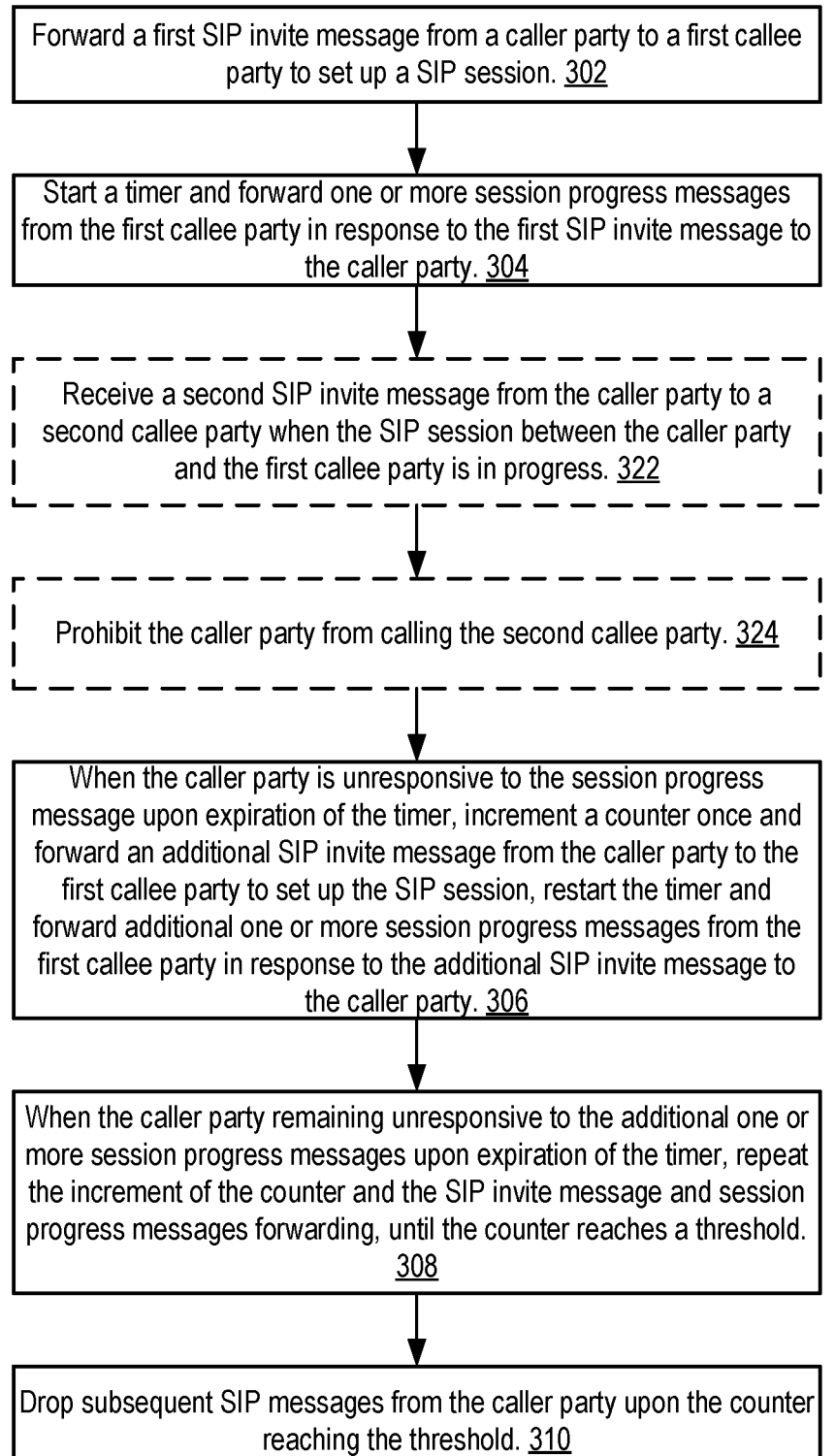
FIG. 3 shows operations to mitigate stealthy DoS attacks per some embodiments.

FIG. 3 shows operations to mitigate stealthy DoS attacks per some embodiments. The operations may be performed by an electronic device implementing the SIP session manager 104 to coordinate SIP calls in a network as discussed herein above. In some embodiments, the electronic device performs a proxy call session control function (P-CSCF) of an IP multimedia subsystem (IMS). In some embodiments, the network implements voice over long-term evolution (VoLTE) or voice over wireless fidelity (VoWi-Fi).

At reference 302, a SIP session manager forwards a first SIP invite message from a caller party to a first callee party to set up a SIP session. At reference 304, the SIP session manager starts a timer and forwarding one or more session progress messages to the caller party from the first callee party in response to the first SIP invite message.

Optionally at reference 322, the SIP session manager receives a second SIP invite message from the caller party to a second callee party when the SIP session between the caller party and the first callee party is in progress. Then at reference 324, the SIP session manager prohibits the caller party from calling the second callee party. The prohibition may last for a configurable duration.

At reference 306, when the caller party is unresponsive to the one or more session progress messages upon expiration of the timer, the SIP session manager increments a counter once and forwards an additional SIP invite message from the caller party to the first callee party to set up the SIP session, and the SIP session manager restarts the timer and forwards additional one or more session progress messages from the first callee party to the caller party in response to the additional SIP invite message.

At reference 308, when the caller party remains unresponsive to the additional one or more session progress messages upon expiration of the timer, the SIP session manager repeats the increment of the counter, the SIP invite message forwarding, the timer restarting, and the session progress messages forwarding, until the counter reaches a threshold. At reference 310, the SIP session manager drops subsequent SIP messages from the caller party upon the counter reaching the threshold.

When the caller party responds to a session progress message with a provisional response acknowledgement (PRACK) message prior to the expiration of the timer, the timer and counter are updated, and the PRACK message is forwarded to the first callee party to set up the SIP session, as shown in FIG. 1.

In some embodiments, when the caller party is registered with the session manager, the counter is removed upon deregistration of the caller party. In some embodiments, when the caller party is not registered with the session manager, the counter is removed after a time duration.

In some embodiments, dropping the subsequent SIP messages from the caller party comprises identifying the caller party through an Internet protocol (IP) address, an IP address and a port number, or an IP multimedia public identity (IMPU) in the first and additional SIP invite messages.

In some embodiments, the caller party is allowed to forward further SIP messages after a time period. In some embodiments, an alarm is issued upon dropping the subsequent SIP messages from the caller party.

Note that while operations at references 322 and 324 are shown as right after the operation at reference 304, the operations at reference 322 and 324 may be performed whenever a SIP from the caller party is in progress as explained relating to FIG. 2.

Electronic Device Implementing the Embodiments

Figure 4:
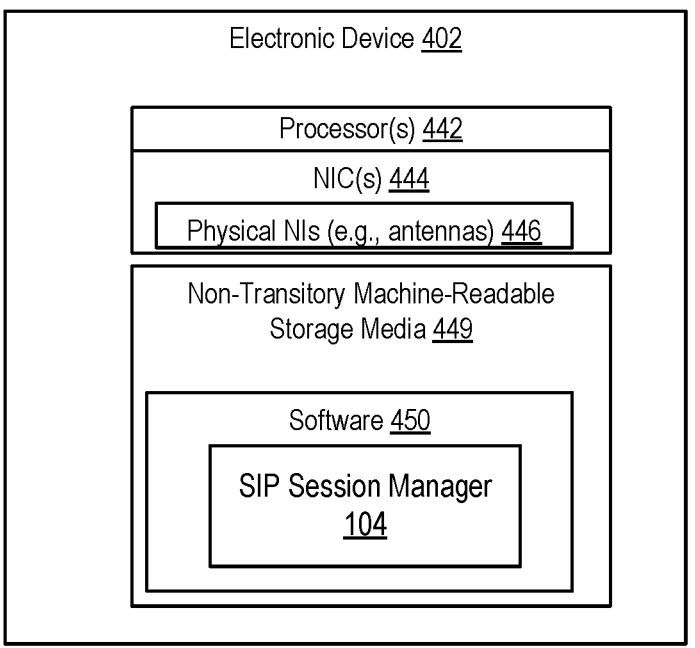
FIG. 4 shows an electronic device that implements operations to mitigate stealthy DoS attacks per some embodiments.

FIG. 4 shows an electronic device that implements operations to mitigate stealthy DoS attacks per some embodiments. An electronic device 402 stores and transmits (internally and/or with other electronic devices over a network) code (which is composed of software instructions and which is sometimes referred to as computer program code or a computer program) and/or data using machine-readable media (also called computer-readable media), such as machine-readable storage media 449 (e.g., magnetic disks, optical disks, solid state drives, read only memory (ROM), flash memory devices, phase change memory) and machine-readable transmission media (also called a carrier) (e.g., electrical, optical, radio, acoustical, or other forms of propagated signals—such as carrier waves, infrared signals).

Thus, the electronic device 402 (e.g., a computer) includes hardware and software, such as a set of one or more processors 442 (e.g., wherein a processor is a microprocessor, controller, microcontroller, central processing unit, digital signal processor, application specific integrated circuit, field programmable gate array, other electronic circuitry, or a combination of one or more of the preceding) coupled to one or more machine-readable storage media 449 to store code for execution on the set of processors and/or to store data. For instance, an electronic device may include nonvolatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) 446 to establish network connections (to transmit and/or receive code and/or data using propagating signals) with other electronic devices. For example, the set of physical NIs 446 (or the set of physical NI(s) in combination with the set of processors 442 executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs) 444, also known as a network interface card, network adapter, or local area network (LAN) adapter. The NIC(s) 444 may facilitate in connecting the electronic device to other electronic devices allowing them to communicate via wire through plugging in a cable to a physical port connected to a NIC 444. One or more parts of an embodiment of the invention may be implemented using different combinations of software, firmware, and/or hardware. The software 450 may be stored within the machine-readable storage media 449 and it may include the SIP session manager 104 and perform operations of embodiments of invention.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). The electronic device 402 implements operations of the embodiments of the invention may be a network device.

In the foregoing description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to coordinate session initiation protocol (SIP) calls by an electronic device in a network, comprising:

forwarding a first SIP invite message from a caller party to a first callee party to set up a SIP session;

starting, by the electronic device, a timer and forwarding one or more session progress messages to the caller party from the first callee party in response to the first SIP invite message, the timer to measure a time period until the electronic device receiving a provisional response acknowledgement (PRACK) message responsive to the one or more session progress messages forwarded to the caller party, wherein the electronic device comprises a third party node apart from the caller party and the first callee party, the third party node coordinating the SIP session;

upon the caller party being unresponsive to the one or more session progress messages at expiration of the timer, incrementing a counter once and forwarding an additional SIP invite message from the caller party to the first callee party to set up the SIP session, restarting the timer and forwarding additional one or more session progress messages from the first callee party to the caller party in response to the additional SIP invite message;

upon the caller party remaining unresponsive to the additional one or more session progress messages when the timer expires, repeating the increment of the counter, the SIP invite message forwarding, the timer restarting, and the session progress messages forwarding, until the counter reaches a threshold; and dropping subsequent SIP messages from the caller party upon the counter reaching the threshold.

2. The method of claim 1, further comprising:

receiving a second SIP invite message from the caller party to a second callee party when the SIP session between the caller party and the first callee party is in progress; and prohibiting the caller party from calling the second callee party.

3. The method of claim 1, wherein when the caller party responds to a session progress message with a PRACK message prior to the expiration of the timer, the timer and counter are updated, and the PRACK message is forwarded to the first callee party to set up the SIP session.

4. The method of claim 1, wherein coordinating the SIP calls in the network is performed by a session manager, and when the caller party is registered with the session manager, the counter is removed upon deregistration of the caller party.

5. The method of claim 1, wherein coordinating the SIP calls in the network is performed by a session manager, and wherein when the caller party is not registered with the session manager, the counter is removed after a time duration.

6. The method of claim 1, wherein dropping the subsequent SIP messages from the caller party comprises identifying the caller party through an Internet protocol (IP) address, an IP address and a port number, or an IP multimedia public identity (IMPU) in the first and additional SIP invite messages.

7. The method of claim 1, wherein the caller party is allowed to forward further SIP messages after another time period.

8. The method of claim 1, wherein an alarm is issued upon dropping the subsequent SIP messages from the caller party.

9. The method of claim 1, wherein coordinating the SIP calls is performed by a proxy call session control function (P-CSCF) of an IP multimedia subsystem (IMS).

10. The method of claim 1, wherein the network implements voice over long-term evolution (VoLTE) or voice over wireless fidelity (VoWi-Fi).

11. An electronic device to coordinate session initiation protocol (SIP) calls in a network, comprising:

a processor and non-transitory machine-readable storage medium that provides instructions that, when executed by the processor, cause the electronic device to perform:

forwarding a first SIP invite message from a caller party to a first callee party to set up a SIP session;

starting a timer and forwarding one or more session progress messages to the caller party from the first callee party in response to the first SIP invite message, the timer to measure a time period until the electronic device receiving a provisional response acknowledgement (PRACK) message responsive to the one or more session progress messages forwarded to the caller party, wherein the electronic device comprises a third party node apart from the caller party and the first callee party, the third party node coordinating the SIP session;

upon the caller party being unresponsive to the one or more session progress messages upon expiration of the timer, incrementing a counter once and forwarding an additional SIP invite message from the caller party to the first callee party to set up the SIP session, restarting the timer and forwarding additional one or more session progress messages from the first callee party to the caller party in response to the additional SIP invite message;

upon the caller party remaining unresponsive to the additional one or more session progress messages when the timer expires, repeating the increment of the counter, the SIP invite message forwarding, the timer restarting, and the session progress messages forwarding, until the counter reaches a threshold; and dropping subsequent SIP messages from the caller party upon the counter reaching the threshold.

12. The electronic device of claim 11, wherein the electronic device is caused to further perform:

receiving a second SIP invite message from the caller party to a second callee party when the SIP session between the caller party and the first callee party is in progress; and prohibiting the caller party from calling the second callee party.

13. The electronic device of claim 11, wherein when the caller party responds to a session progress message with a PRACK message prior to the expiration of the timer, the timer and counter are updated, and the PRACK message is forwarded to the first callee party to set up the SIP session.

14. The electronic device of claim 11, wherein coordinating the SIP calls in the network is performed by a session manager, and when the caller party is registered with the session manager, the counter is removed upon deregistration of the caller party.

15. The electronic device of claim 11, wherein coordinating the SIP calls in the network is performed by a session manager, and wherein when the caller party is not registered with the session manager, the counter is removed after a time duration.

16. The electronic device of claim 11, wherein dropping the subsequent SIP messages from the caller party comprises identifying the caller party through an Internet protocol (IP) address, an IP address and a port number, or an IP multimedia public identity (IMPU) in the first and additional SIP invite messages.

17. The electronic device of claim 11, wherein the caller party is allowed to forward further SIP messages after another time period.

18. The electronic device of claim 11, wherein an alarm is issued upon dropping the subsequent SIP messages from the caller party.

19. The electronic device of claim 11, wherein coordinating the SIP calls is performed by a proxy call session control function (P-CSCF) of an IP multimedia subsystem (IMS).

20. The electronic device of claim 11, wherein the network implements voice over long-term evolution (VoLTE) or voice over wireless fidelity (VoWi-Fi).

\* \* \* \* \*